US010688328B2

(12) United States Patent
Pristach

(10) Patent No.: US 10,688,328 B2
(45) Date of Patent: Jun. 23, 2020

(54) FORCIBLE ENTRY DOOR STILE SYSTEM

(71) Applicant: Peter Carl Pristach, Bluemont, VA (US)

(72) Inventor: Peter Carl Pristach, Bluemont, VA (US)

( * ) Notice: Subject to any disclaimer, the term of this patent is extended or adjusted under 35 U.S.C. 154(b) by 295 days.

(21) Appl. No.: 15/981,614

(22) Filed: May 16, 2018

(65) Prior Publication Data

US 2018/0333600 A1 Nov. 22, 2018

Related U.S. Application Data

(60) Provisional application No. 62/507,240, filed on May 17, 2017.

(51) Int. Cl.

| | |
|---|---|
| ***G09B 19/00*** | (2006.01) |
| ***A62C 99/00*** | (2010.01) |
| ***E06B 1/16*** | (2006.01) |
| ***E05C 19/00*** | (2006.01) |
| ***E06B 3/12*** | (2006.01) |
| *A62B 3/00* | (2006.01) |

(52) U.S. Cl.

CPC ........ *A62C 99/0081* (2013.01); *E05C 19/003* (2013.01); *E06B 1/16* (2013.01); *E06B 3/12* (2013.01); *A62B 3/005* (2013.01)

(58) Field of Classification Search

CPC ...... G09B 19/00; G09B 9/003; A62C 99/0081
USPC .................................................. 434/219, 226
See application file for complete search history.

(56) References Cited

U.S. PATENT DOCUMENTS 5,906,493 A * 5/1999 Bishop ..................... G09B 9/00 292/357
6,877,988 B2 * 4/2005 Phillips .................. G09B 19/00 434/219
7,789,666 B2 * 9/2010 Sovine .................. G09B 9/003 434/226
7,967,326 B2 * 6/2011 Klementowicz, III ..................... G09B 19/00 280/656
7,972,139 B2 * 7/2011 Staub ..................... G09B 19/24 434/226
8,167,621 B2 * 5/2012 Allen ..................... G09B 19/00 109/23
8,197,257 B2 * 6/2012 Clewis ..................... A62B 5/00 434/226
8,408,917 B2 * 4/2013 Perrone ................ G09B 19/003 434/226
8,439,685 B2 * 5/2013 Shelley ............. A62C 99/0081 434/226
8,485,825 B2 * 7/2013 Walker ................... G09B 19/00 434/226
8,720,117 B2 * 5/2014 Phillips ..................... F42B 8/00 434/226
9,181,735 B2 * 11/2015 Troxell ............... E05B 17/0062
9,550,082 B2 * 1/2017 Britton .............. A62C 99/0081

(Continued)

*Primary Examiner* — Kurt Fernstrom

(74) *Attorney, Agent, or Firm* — Muir Patent Law, PLLC

(57) ABSTRACT

A training door, door frame, and system are disclosed that allow first responders to train on breaking open locked doors. The door frame provides a channel for a replaceable rod or bar formed of a door material, so that during training, while the rod or bar may be disfigured by repeated training exercises, the remainder of the door and frame remain intact. In this manner, only the rod or bar may need to be replaced after repeated training, rather than the entire door or frame.

21 Claims, 13 Drawing Sheets

(56) References Cited

U.S. PATENT DOCUMENTS

| | | | | |
|---|---|---|---|---|
| 9,805,616 | B1 * | 10/2017 | Brubaker | G09B 19/24 |
| 2005/0050816 | A1 * | 3/2005 | Manning | E06B 5/11 52/213 |

* cited by examiner

FORCIBLE ENTRY DOOR STILE SYSTEM

This application claims priority to and is a non-provisional application of U.S. Provisional Patent Application No.: 62/507,240, filed May 17, 2017, the contents of which are incorporated by reference in their entirety herein.

TECHNOLOGICAL FIELD

The herein described subject matter is directed to a system used in training firefighters or other first responders and, more particularly, to a system that trains firefighters in how to use well known firefighting equipment—such as Halligan bars and fire axes—to expeditiously gain access through locked doors into or within a burning building.

BACKGROUND

Firefighters or other first responders are often confronted with the urgent need to gain access through locked doors or windows for several reasons, i.e. to effectively fight a fire, to get help to the elderly, to help stricken individuals get necessary medical care, etc. Gaining quick access through locked doors can be paramount to successfully fighting a fire for many reasons, including: accessing the fire itself; opening an emergency escape route; searching for trapped persons; providing ventilation; obtaining a strategic location from which to combat the fire; etc.

Firefighters carry tools with them for fighting fires. Two tools that firefighters carry and which are used in breaching locked doors include a Halligan bar and fire axe. Halligan bars were first made in the 1940s and comprise a fork at one end and an adz blade and pike at the other end. In use, the Halligan bar's adz end is placed between the door and the doorjamb to pry the two apart. The adz can be hammered further between the door and doorjamb by using a flat side of the fire axe as a sledge hammer. In this way, the tools are used to crush the door or doorjamb and pry the door away from the doorjamb thereby opening the doorway.

An expert, well trained firefighter wielding a Halligan bar and fire axe can breach virtually any locked door in a matter of seconds no matter whether the door and doorjamb are constructed of wood, metal, or other materials. However, to become an expert in using Halligan bars and fire axes requires hours of dedicated training in their use.

Conventional systems have been developed to provide training to firefighters and others in the use of Halligan bars and fire axes for breaching locked doors, but these systems contain one or more disadvantages that provide a less than stellar training experience. For example, such systems may be bulky and very heavy which makes them difficult to move to new locations. Movement to new locations, i.e. different firehouses, for these systems requires that they first be completely disassembled, the parts moved to the new location, and then the parts reassembled at the new location with these steps being repeated for each move.

The conventional systems also have the drawback of using movable springs or hydraulic systems that attempt to simulate the effect of crushing the door or doorjamb by providing tension or resistance to the training firefighter. However, the crushability of a door or doorjamb depends upon the material that is being crushed be it wood, metal, or other materials. Yet the movable springs or hydraulic systems even when set to a particular setting associated with the simulation of crushing a particular material do not accurately reproduce the feeling of actually crushing that particular material.

Other conventional training systems do not allow for repeated uses before key portions of the system need to be replaced or new undamaged doors need to be utilized for additional training sessions.

SUMMARY

There has been a need for a training system that overcomes the drawbacks identified above and which can be repeatedly used in training sessions before an easily replaceable and inexpensive element of the system needs to be switched out.

One exemplary embodiment of the herein described training systems includes a lightweight easily movable three-sided door frame system that can be incorporated onto an existing door and doorjamb assembly to provide a Halligan bar training system for firefighters. The embodiment includes a replaceable and crushable door material that is fitted into the door frame system.

Some embodiments directed to the door frame system comprise top and bottom rails and a door stile therebetween that allows for the system to be easily fitted to an existing door—the system can be secured to the existing door using bolt and nut assemblies. The compactness of the door frame system makes it easy to move to other locations and allows for its mounting to the existing door with only a minimal amount of trimming of the door being required. More particularly, in some embodiments, only the width of the existing door need be trimmed along the vertical length of the door frame system, although some users may prefer to also trim top and bottom horizontal portions of the existing door.

An open channel may be formed at the stile end of the door frame, and in one embodiment a piece of door material (e.g., a 2"×2" furring strip of wood, which may have actual dimensions of less than 2" by 2", and may be a square-shaped strip of wood with a cross-sectional length and width of 1½"×1½" or slightly more, like 1.55"×1.55" so that the dimensions of the wood strip are about 2-5% greater than the dimensions of the open channel to allow it to be compressibly affixed within the channel) is placed in the open channel as the crushable material that the firefighters can use in their training. In other embodiments a rounded, rectangular, or square shaped metal rod can be placed within the open channel for providing firefighter training on metal doors. As will be recognized by those skilled in the art, various materials which are used in an existing door's construction can be placed within the open channel, thereby providing training to firefighters on how best to crush the placed material and gain access through the locked door.

BRIEF DESCRIPTION OF THE DRAWINGS

The exemplary embodiments will be more clearly understood from the following detailed description taken in conjunction with the accompanying drawings in which.

DETAILED DESCRIPTION

The present disclosure now will be described more fully hereinafter with reference to the accompanying drawings, in which various exemplary embodiments are shown. The invention may, however, be embodied in many different forms and should not be construed as limited to the exemplary embodiments set forth herein. These example exemplary embodiments are just that—examples—and many embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein.

Although the figures described herein may be referred to using language such as "one embodiment," or "certain embodiments," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Figure 1:
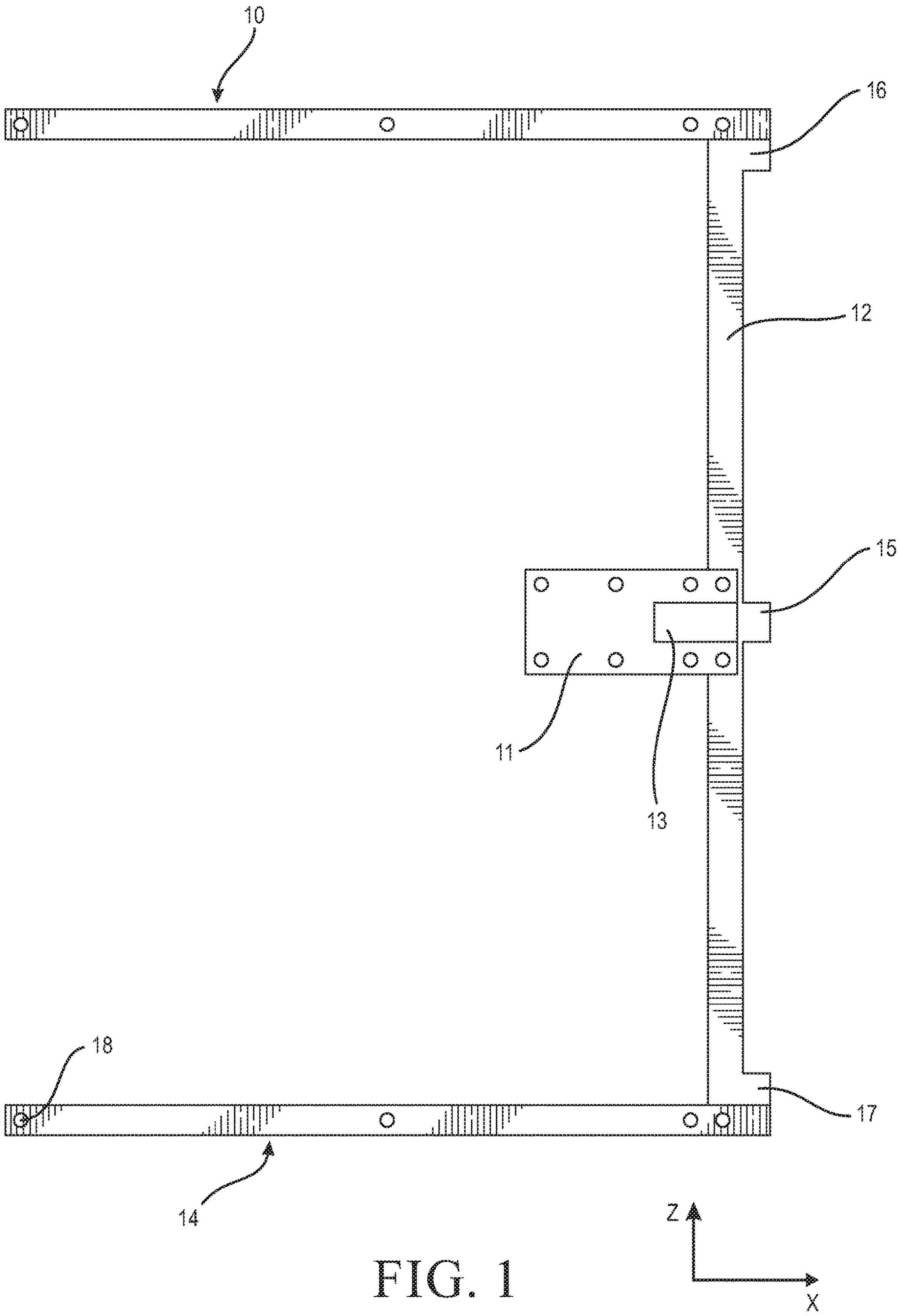
FIG. 1 is a schematic front view of a door frame system used for training firefighters, according to example embodiments.
Figure 2:
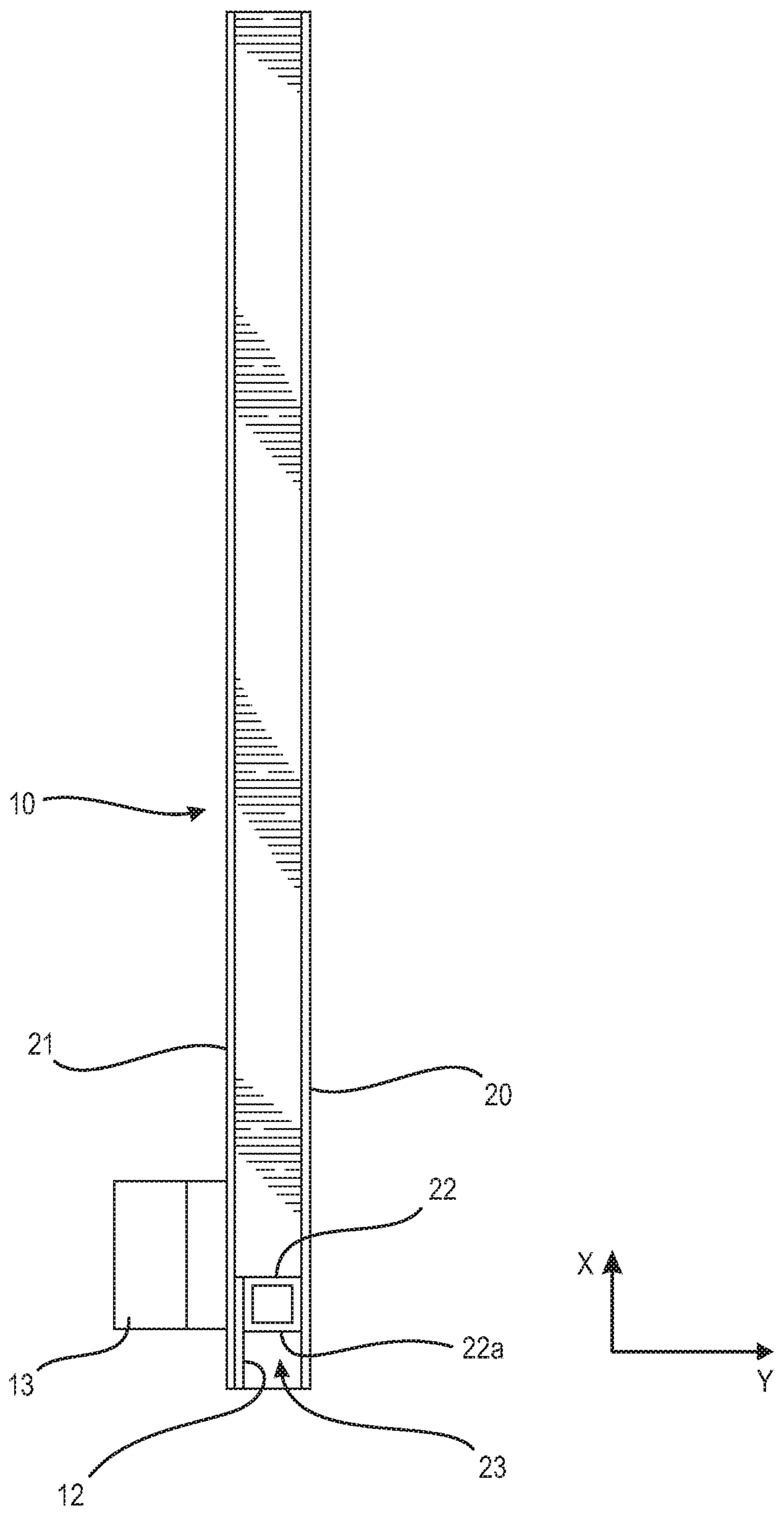
FIG. 2 is a schematic top view of the door frame system shown in FIG. 1, according to example embodiments.
Figure 3:
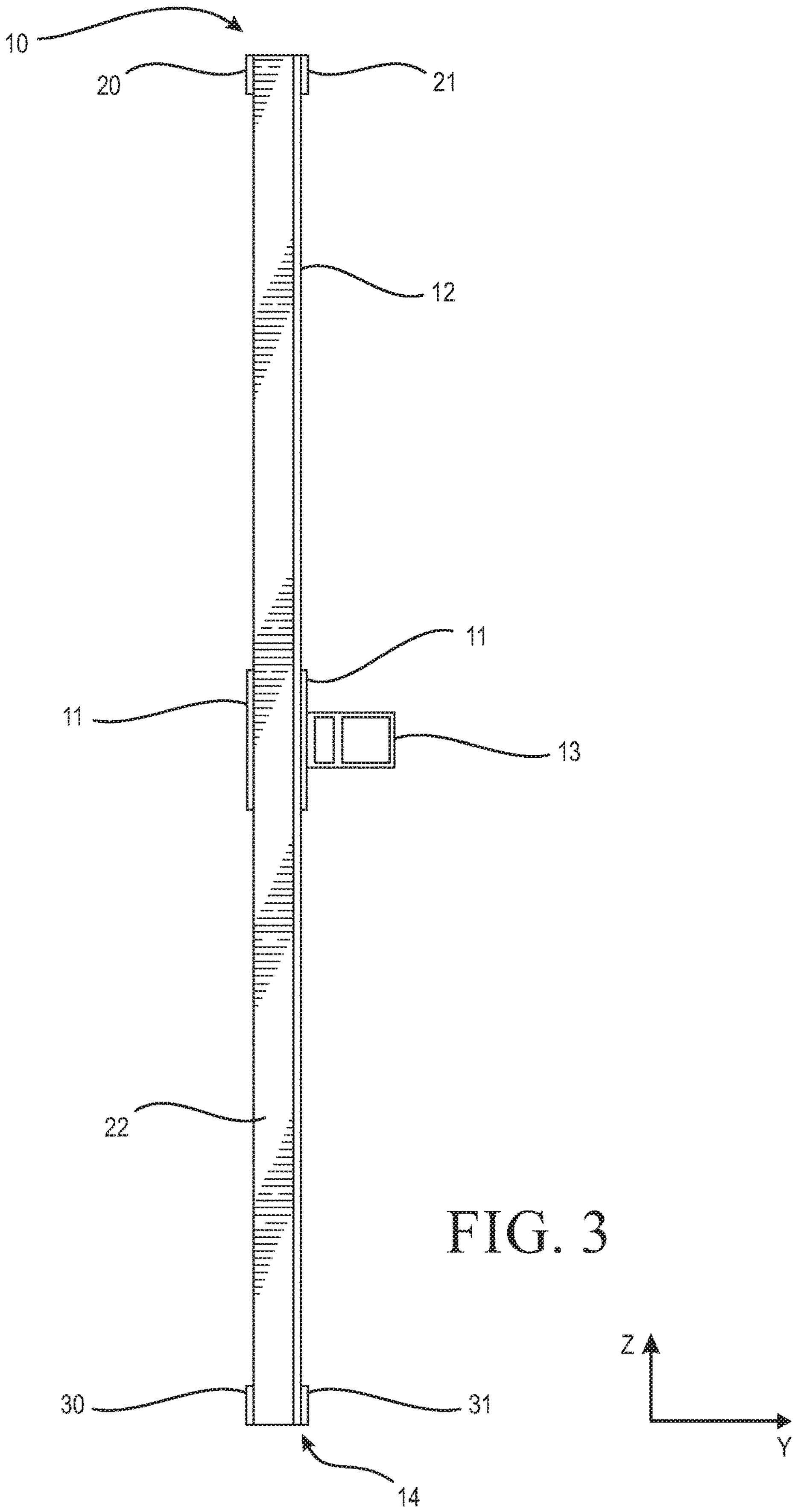
FIG. 3 is a schematic side view of the door frame system shown in FIG. 1, according to example embodiments.

FIGS. 1-3 show an exemplary embodiment of the door frame system to include a pair of upper brackets which form a top rail 10, a pair of lower brackets which form a lower rail 14, a hollow square shaped tube 22, having an inner side disposed a particular distance (e.g., in one embodiment approximately three inches) from one end of the brackets that form top rail 10 and bottom rail 14, and a plate 12 that includes jutting members 15, 16, and 17 which jut out from the main portion of plate 12 by a particular distance (e.g., in one embodiment approximately one and one-quarter inches). The vertical lengths of the jutting members can be different amounts, such as, in certain embodiments, two and one half inches as shown up to six inches or more. Different jutting members 15, 16, and 17 can have different vertical lengths.

In one embodiment, the brackets are approximately three feet in length, one and one-half inches in width, and one-quarter inch in thickness. However, other dimensioned brackets can also be used. In one embodiment, plate 12 can be approximately 44 inches in length, 3 inches in width at the jutting members 15, 16, and 17 and one and three-quarter inches in width at the main portion, and one-quarter inch in thickness. However, plates with other dimensions can also be used. The above described members can be made of a metal such as steel, or of any other strong, rigid material. One or more of the jutting members, also described as protrusions, may be omitted in certain embodiments.

Approximately half way down plate 12 are disposed back to back box plates 11, one of which has mounted thereon box 13 which functions as a door locking mechanism. Bolt holes 18 are provided in the various above-described members to facilitate assembly of the system with an existing door therebetween. Box 13 and box plates 11 may be formed of metal, and in one embodiment, box 13 is welded to one of box plates 11, as shown for example in FIG. 11. The box 13 may have a tubular shape and may include an opening through which a lock, such as a piece of wood, is inserted to simulate locking of the door. See, e.g., FIG. 12. Though welding is described as one example for connecting box 13 to one of the box plates 11, other connectors may be used, such as bolts, for example.

FIG. 2 depicts a top view of the door frame system looking down onto top rail 10. Top rail 10 is comprised of upper side bracket 20 and upper side bracket 21. Similarly, bottom rail 14 is comprised of lower side bracket 30 and lower side bracket 31 (shown in FIG. 3). The member 22, which may be a rod such as a hollow square shaped tube, may be welded onto plate 12, along its length, which in turn may be welded to upper side bracket 21 and lower side bracket 31. Though a square shape is shown and described, and welding may be used, other shapes and connection mechanisms may be used to connect a rod to the plate 12. For example, a non-square rectangular shape may be used for member 22, or a 3-sided rod may be used. Therefore, member 22 maybe a rod having different shapes that result in flat surfaces affixed to the upper and lower rails 10 and 14 and facing the outside of the door frame. As an alternative to or in addition to welding, bolts may be used for the connection between the member 22 and rails 10 and 14. The upper side brackets 20 and 21, plate 12 which includes jutting out members 15, 16, and 17, lower side brackets 30 and 31, and an outer surface 22*a* of the member 22 when assembled define an open channel or stile spine 23 formed between the upper and lower rails 10 and 14. The stile spine 23 may be, for example, an open channel or receptacle formed between the upper and lower rails 10 and 14. The open channel may extend vertically between the upper and lower rails 10 and 14. As described further below, the open channel may have an open side facing toward an outside of the door frame (e.g., in a horizontal direction the same as a horizontal direction in which the upper and lower rails 10 and 14 extend), and may have a size and shape configured to receive a rod or bar formed of a door material and to compressibly affix the rod or bar within the open channel. One example of the open channel can be seen in FIG. 5, which depicts the channel opening toward an outside of the door frame.

FIG. 3 shows a side view of the door frame system with the side brackets 20, 30 being on the left side of the drawing and side brackets 21, 31 being on the right side of the drawing. Member 22 is attached at right angles to top and bottom rails 10 and 14. Also shown are box plates 11 disposed on either side of member 22 with the box 13 being attached to one of the box plates 11.

In some embodiments, a door frame system may comprise a kit including a set of components that can be assembled and placed onto an existing door, or a door having a reduced size. For example, the kit may include a top rail 10, a lower rail 14, a member 22 such as a hollow square shaped tube, a plate 12, a box 13, box plates 11, various bolts, and hinges for connecting the door frame to a doorway frame. The compressible material piece can be included in the kit as well. Purchasers of the kit can then assemble the components onto a door, including welding some portions in some cases, to form a training door.

FIGS. 4-7 show in perspective view the door frame system of FIGS. 1-3 assembled, albeit not on an existing door, without any compressible material placed in stile spine 23 formed between the upper and lower rails 10 and 14. The reference numerals in these figures that are identical to reference numerals used in FIGS. 1-3 are for the same or similar components.

Figure 4:
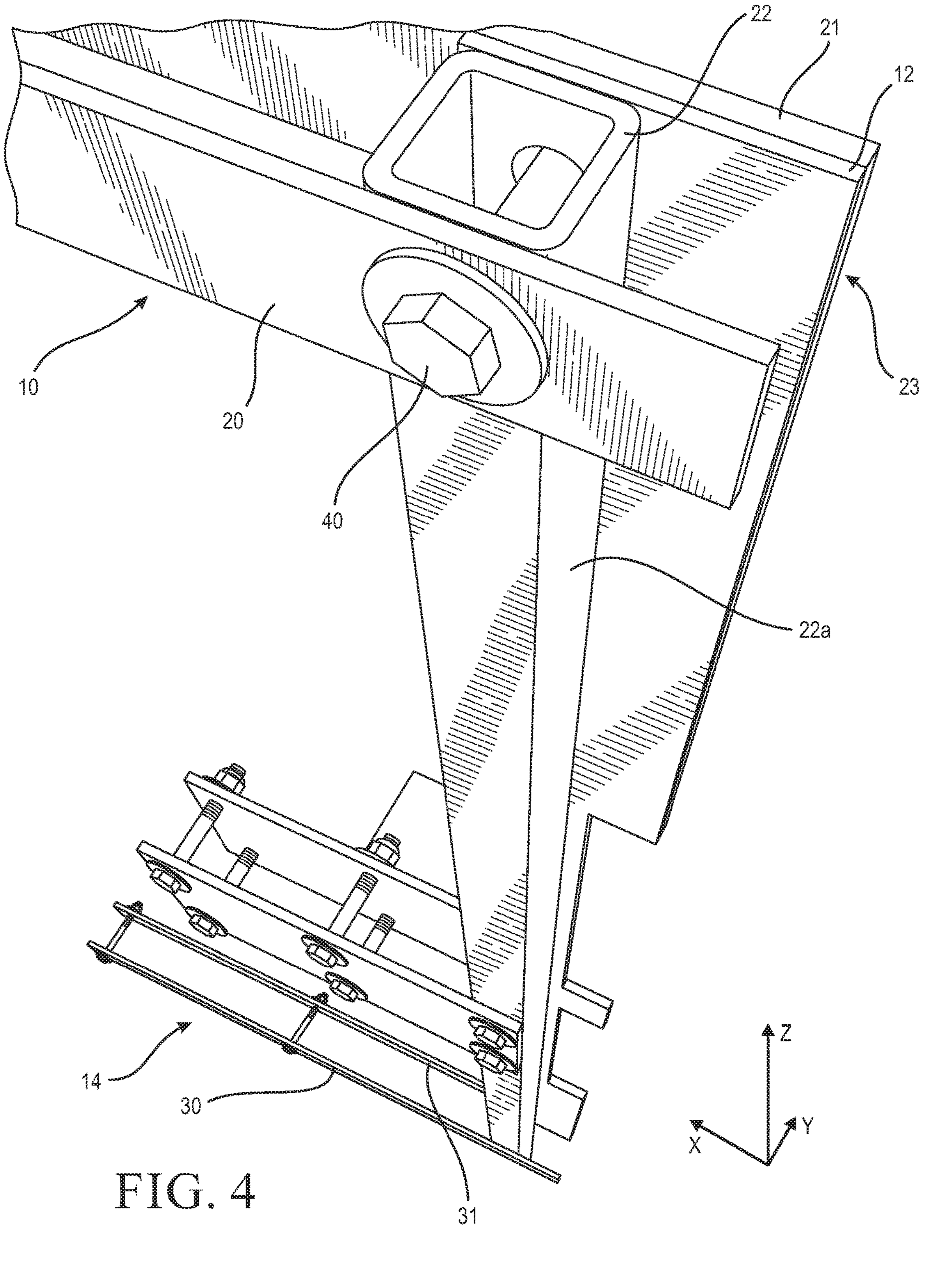
FIGS. 4-7 show perspective views of the assembled door frame system without any compressible material placed therein, according to example embodiments.
Figure 5:
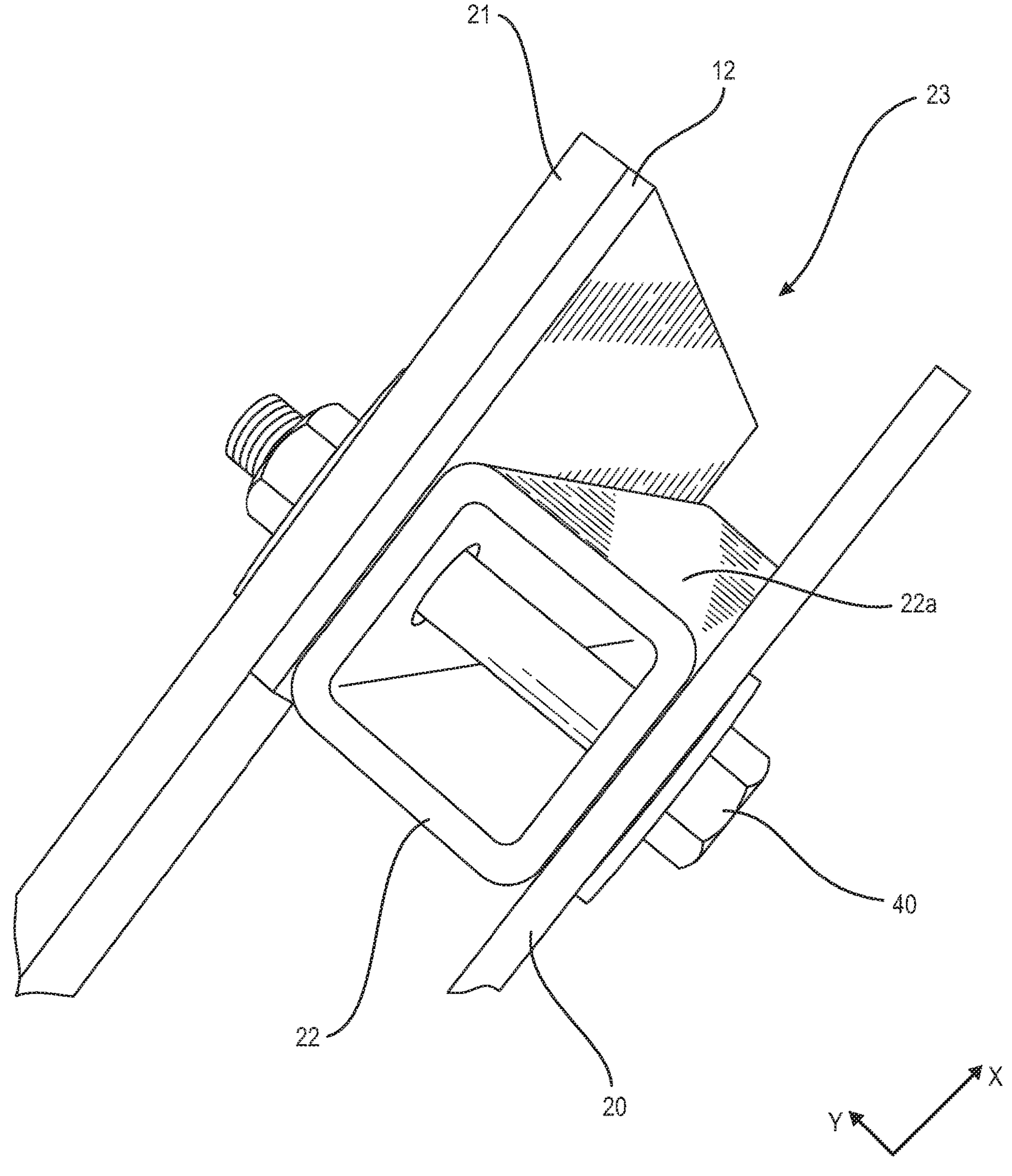
Figure 6:
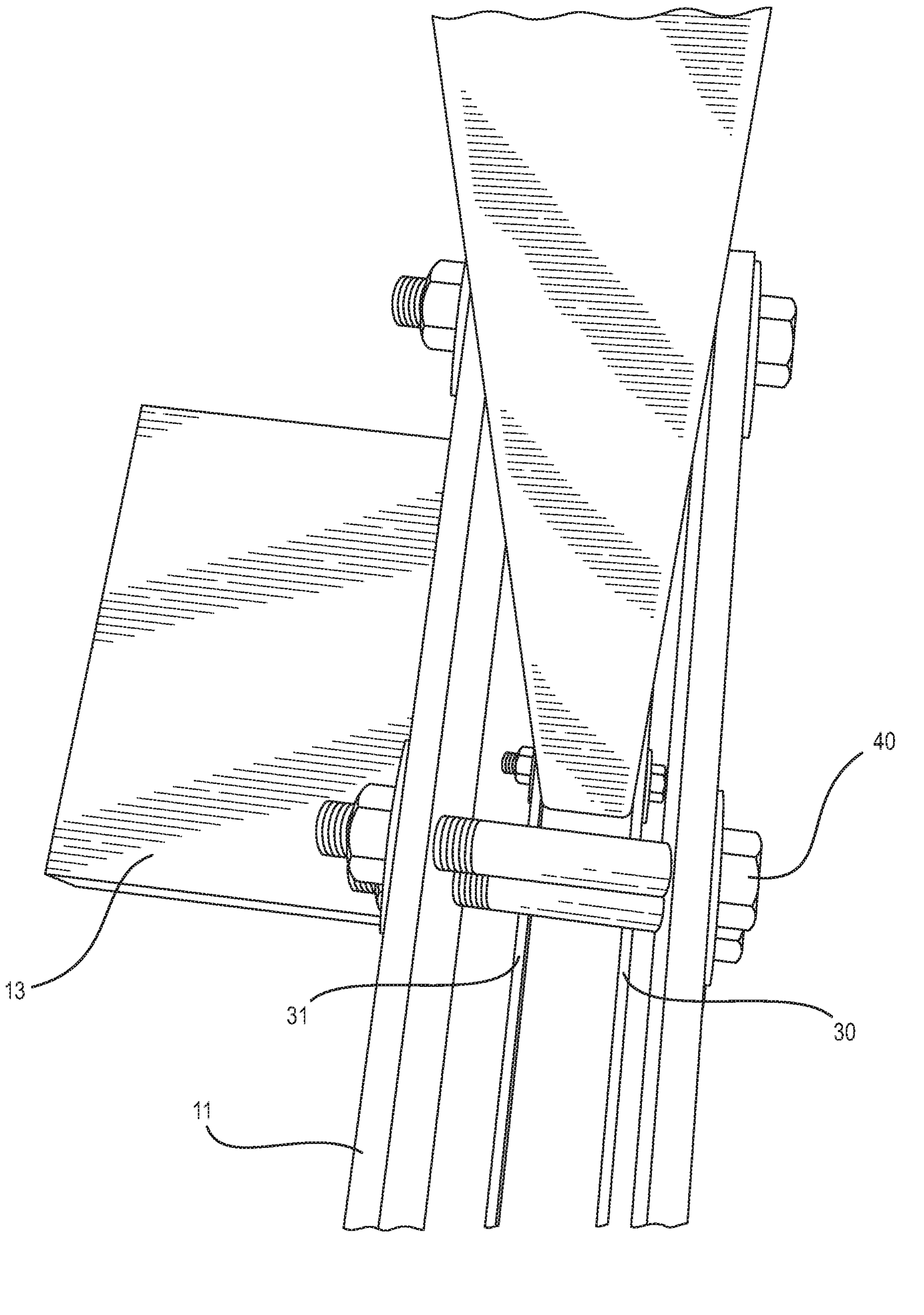
Figure 7:
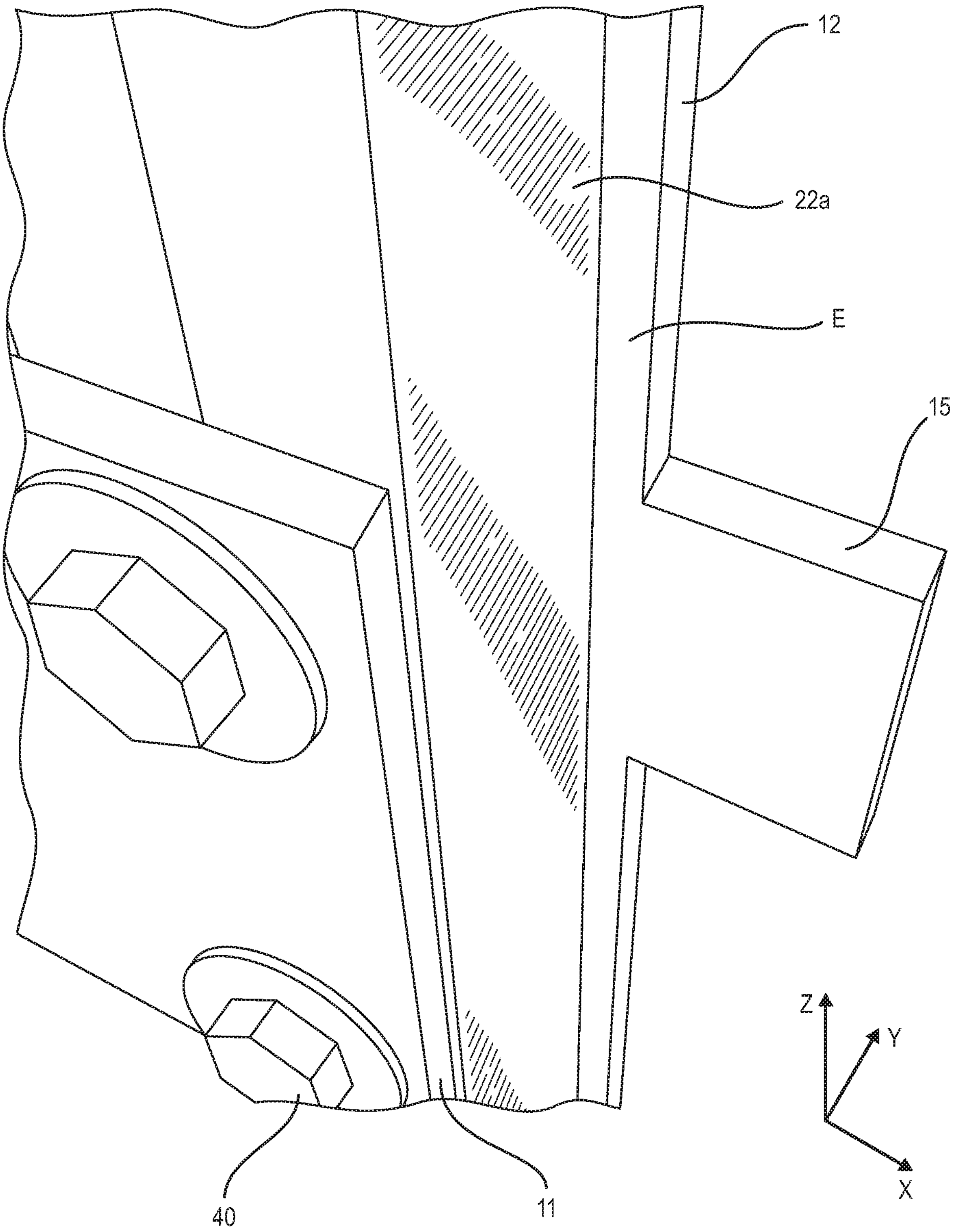

For example, FIG. 4 shows the member 22 (e.g., a hollow square shaped tube) welded to plate 12 which is in turn welded to side bracket 21, and shows that the upper rail 10 and lower rail 14 are perpendicularly attached to member 22 by bolt and nut assemblies 40. FIG. 5 shows in greater detail the welded connections between plate 12, bracket 21 and member 22 (e.g., in some embodiments, plate 12 may be welded to bracket 21, and may also be welded to member 22; bolts may be used in addition to the welding to strengthen the connection, or may be used instead of the welding for a simpler connection). FIG. 6 shows in detail the connection of box plates 11 to each other (albeit without the existing door in between) using nut and bolt assemblies 40, and that the box 13 is carried by the box plate 11 that is on the same side of the assembly as lower bracket 31 (and therefore also upper bracket 21). FIG. 7 shows plate 12 having jutting member 15, and box plate 11 and nut and bolt assemblies 40. As can be seen in FIG. 7, in one embodiment, an edge portion E of plate 12 extends beyond an outer side of the member 22 (e.g., beyond surface **22*a*) by a particular amount (e.g., ¼-inch to ½-inch). This can be used to secure the compressible material in the open channel 23** and helps avoid bowing of the compressible material upon performing training exercises.

Based on the discussion above, a member 22, such as a square tubular rod, and a plate 12 may be connected to each other such that the plate 12 extends between the top and bottom rails 10 and 14, and the member 22 is adjacent to the plate 12 along its length and is at right angles to the top and bottom outward brackets of the rails to form a U-shaped assembly. The member 22 may include an outer surface **22*a* facing toward an outside of the door frame and extending between the top and bottom rails 10 and 14**.

Figure 9:
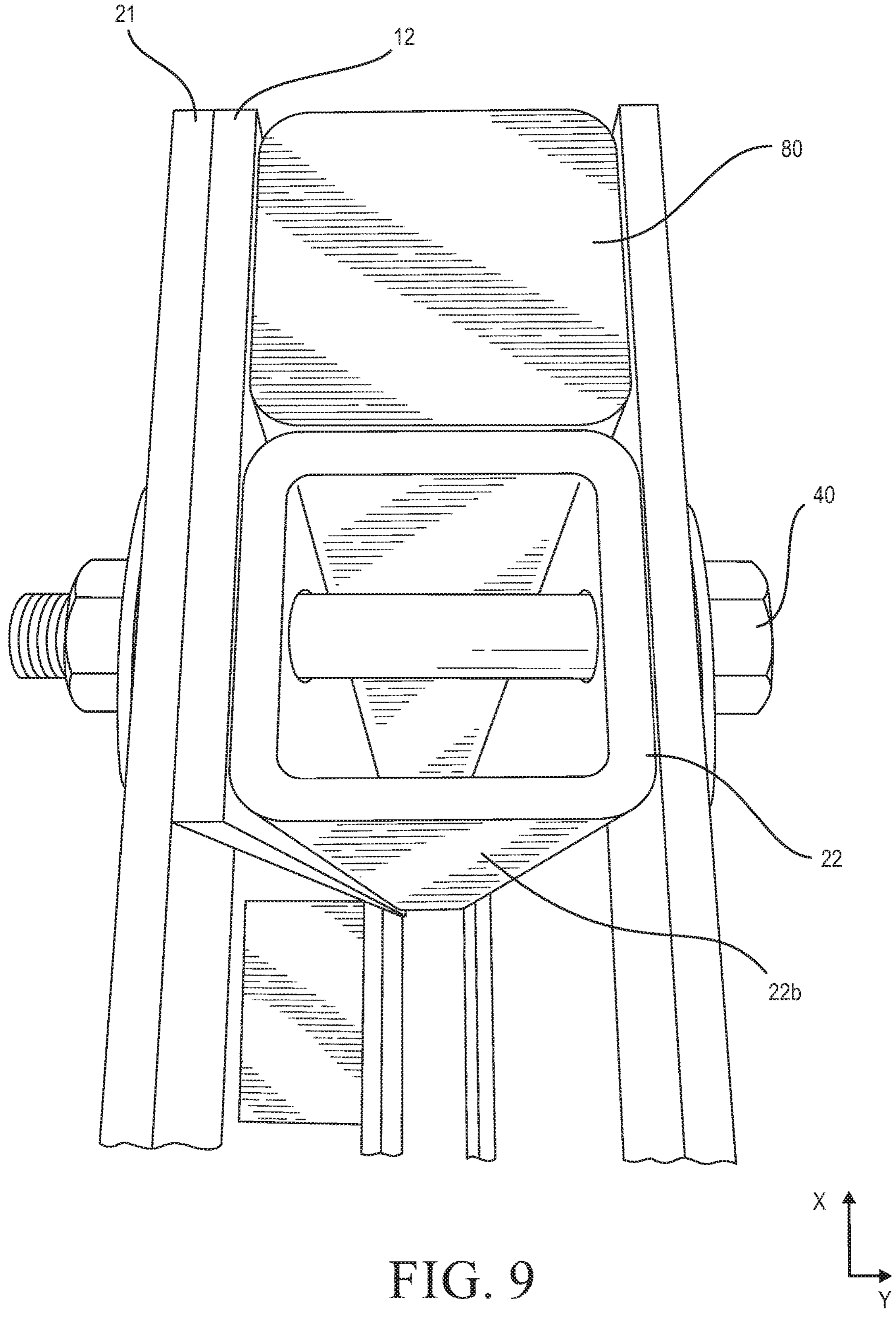

The plate 12 may include a straight portion extending lengthwise between the top rail 10 and the bottom rail 14, and may include a plurality of protrusions extending along a lengthwise direction (e.g., horizontal, X-direction) in which the top rail 10 and bottom rail 14 extend (as can be seen, e.g., in FIGS. 1 and 4), the protrusions (e.g., 15, 16, and 17) include a plurality of protrusions arranged vertically (e.g., in a Z-direction) along the length of the straight portion and connected to the straight portion, and extending beyond the straight portion in the lengthwise direction (e.g., horizontal, X-direction) in which the top rail 10 and bottom rail 14 extend. A top protrusion 16 in one embodiment overlaps the top rail 10 and a bottom protrusion 17 overlaps the bottom rail 14 (e.g., as shown in FIGS. 5 and 9).

As can be seen, for example, in the figures mentioned above, the top and bottom rails 10 and 14 each extend lengthwise in a first, direction (e.g., horizontal, X-direction), and the plate 12 and the member 22 each extends lengthwise in a second direction (e.g., vertical, Z-direction), and the plate 12 extends in the first, horizontal direction beyond the outer surface **22*a* of the member 22. As shown, e.g., in FIG. 7, in one embodiment, the plate 12 includes a first portion E that extends a first distance in the first direction beyond the outer surface of the member 22 (e.g., beyond surface 22*a*), and second portions (15, 16, 17) that extend a second distance, greater than the first distance, beyond the outer surface of the member 22 in the first direction to protrude beyond the first portion. The first distance may be, for example, between ¼-inch and ½-inch. The second distance may be, for example, about 1½ inches beyond surface 22*a*, and in some cases may be 2 inches, though it is not limited thereto. The surface 22*a* may face the same direction as the open side of the open channel. In one embodiment, the straight portion of the plate 12 overlaps the member 22 in a third direction (e.g., horizontal, Y-direction) perpendicular to the first direction, and where the protrusions are not connected to the straight portion, extends in the first direction beyond the member 22**.

FIGS. 8-11 show in perspective view the door frame system of FIGS. 1-3 assembled, albeit not on an existing door, with compressible material 80 (i.e. wood) placed in stile spine 23 formed between the upper and lower rails 10 and 14. The compressible material may be referred to as a rod, or more specifically, as a removable rod, or compressibly-connected rod. The reference numerals in these figures that are identical to the reference numerals used in FIGS. 1-3 are for the same or similar components.

Figure 8:
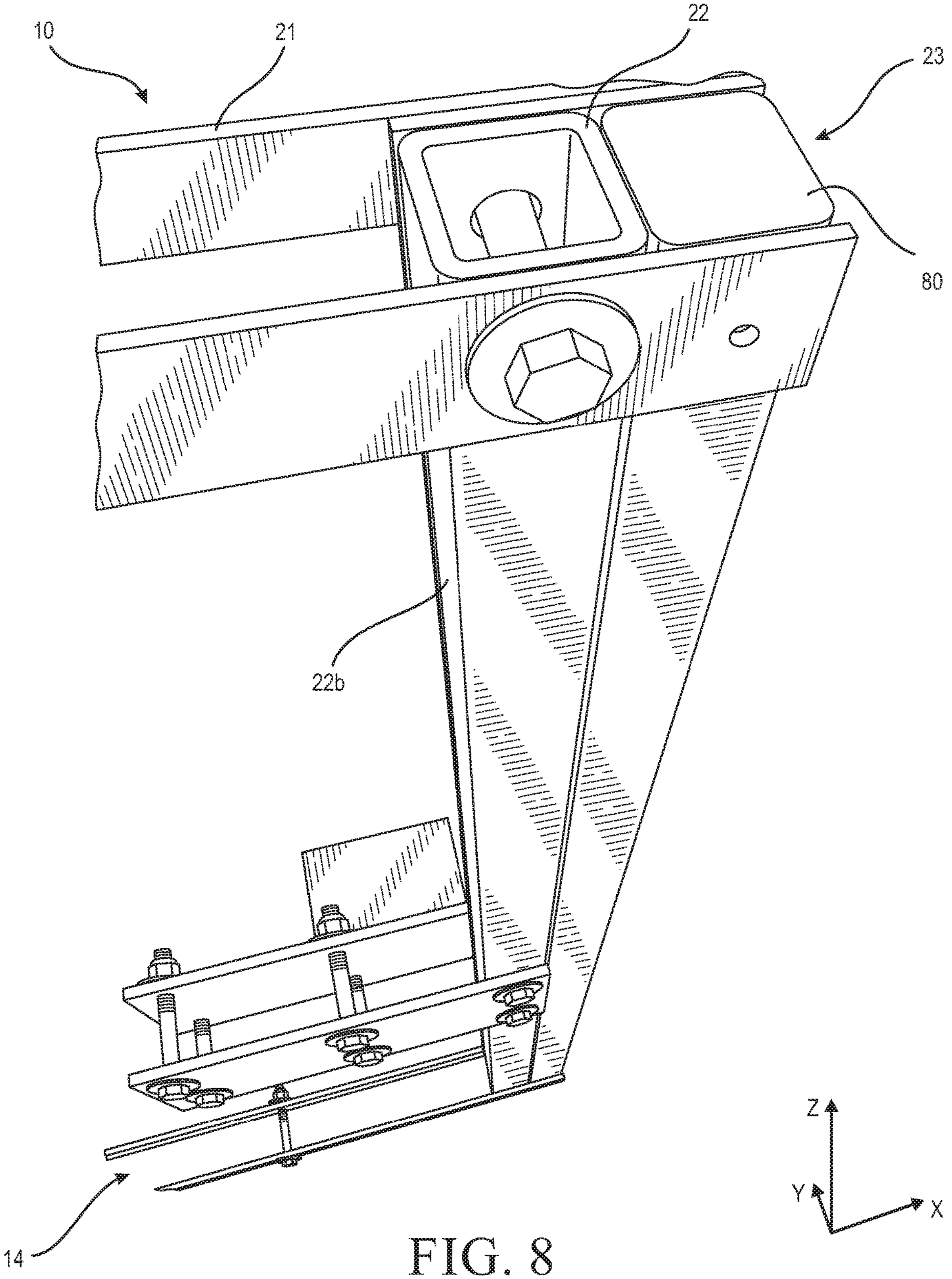
FIGS. 8-11 show perspective views of the assembled door frame system with compressible material placed therein, according to example embodiments.
Figure 10:
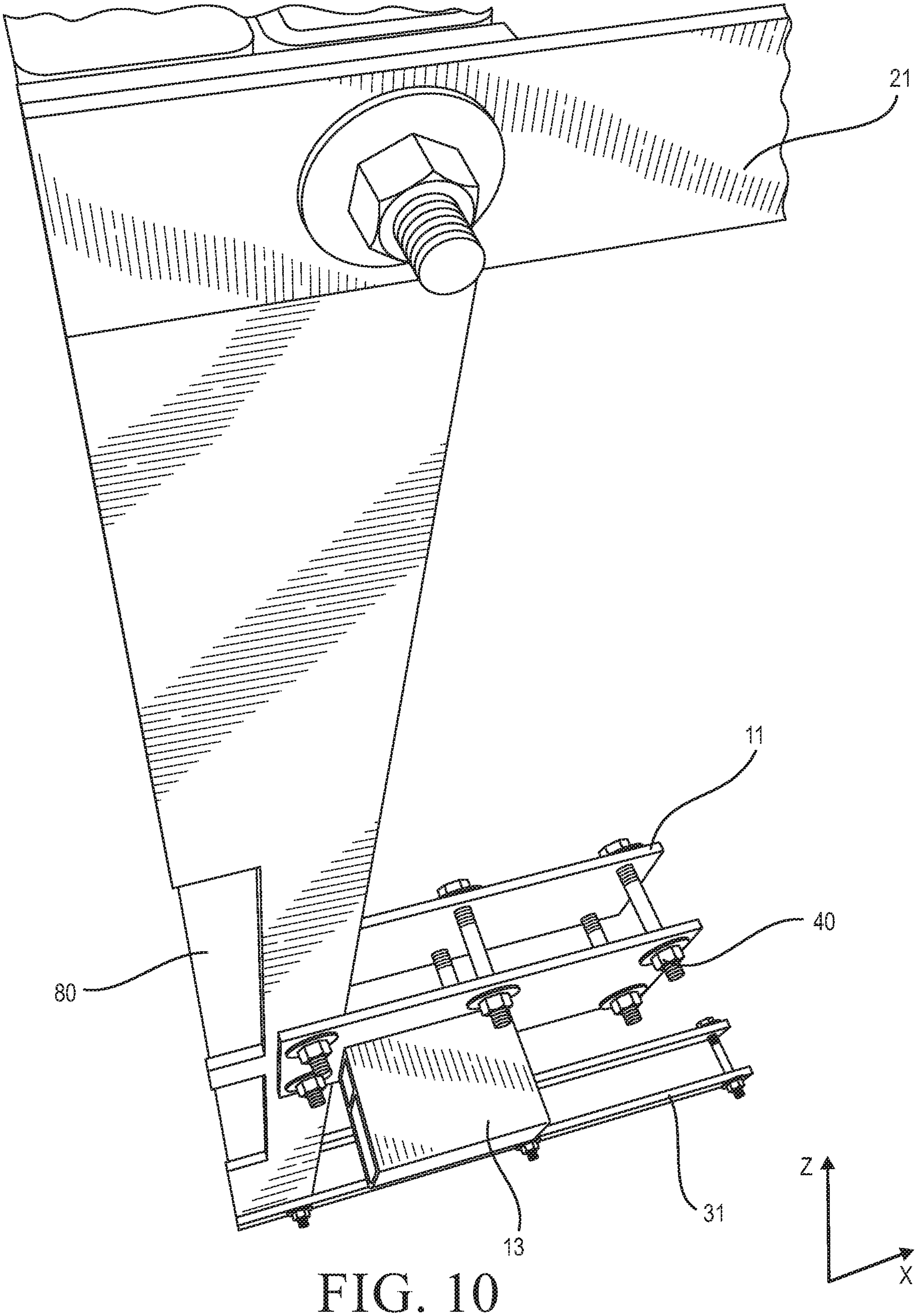
Figure 11:
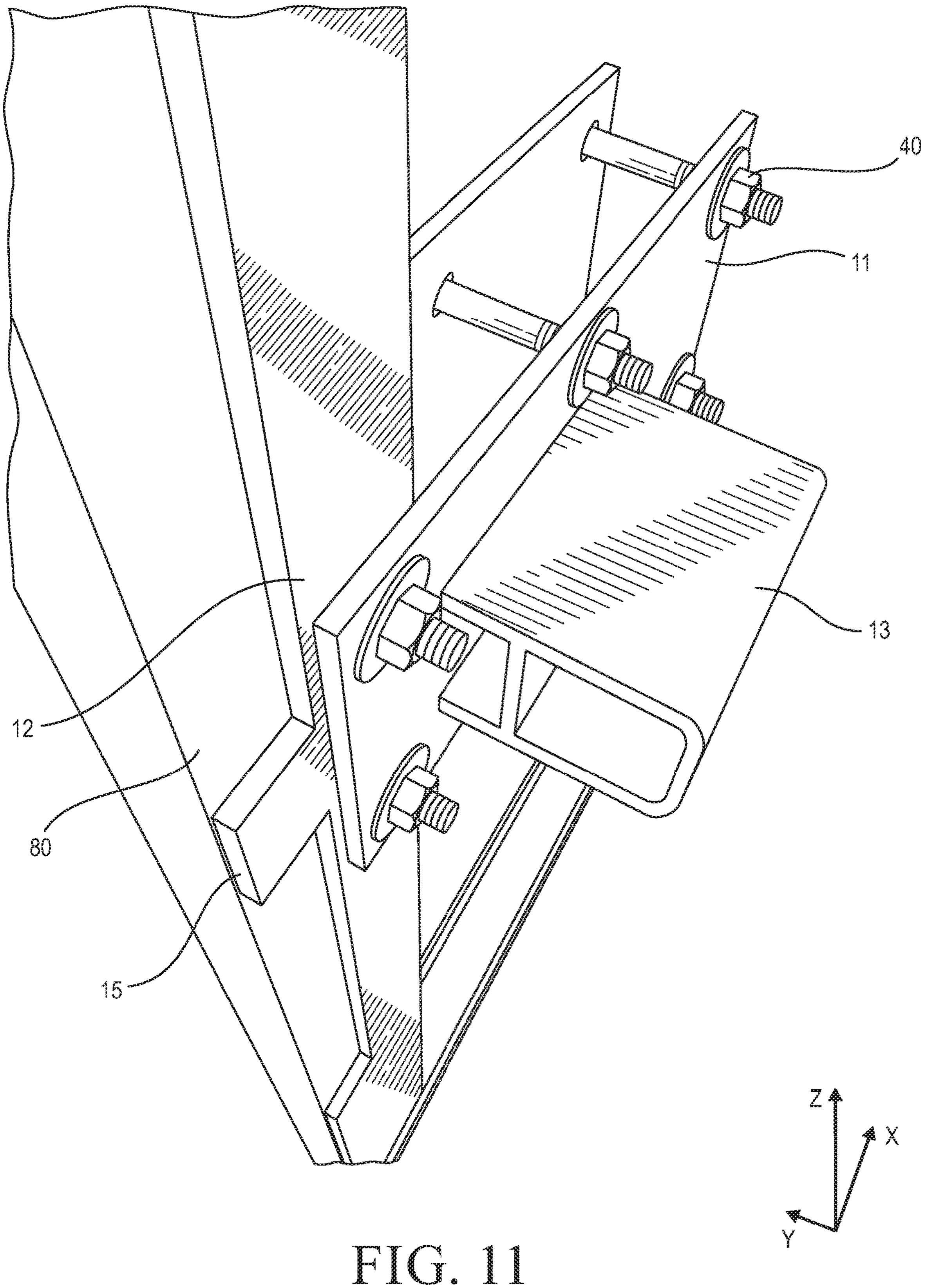

For example, FIG. 8 shows the member 22 welded to plate 12 which is in turn welded to upper bracket 21, and shows that the upper rail 10 and lower rail 14 are perpendicularly attached to member 22 by bolt and nut assemblies 40. FIG. 9 shows in greater detail the welded connections between plate 12, bracket 21 and member 22 (e.g., in one embodiment, plate 12 is welded to bracket 21 and is also welded to member 22. FIG. 10 shows in detail the connection of box plates 11 to each other (albeit without the existing door in between) using nut and bolt assemblies 40, and that the box 13 is carried by the box plate 11 that is on the same side of the assembly as brackets 21 and 31. FIG. 11 shows plate 12 having jutting member 15. When a door material, such as a furring strip of wood which may have a rod shape, is placed into the open channel 23, it may be held in place due to tension created by the two brackets of each rail. For example, a width between the two brackets can be slightly smaller than the width of the furring strip, so that the furring strip has to be forced into the open channel 23. Because the furring strip can be formed of a material that is compressible, such as wood, it remains firmly in place, and therefore firmly fits in the open channel 23. Thus it may be described as a compressibly-connected rod or compressibly-connectible rod that has a size and shape that firmly fits in the open stile spine. The compressibly-connectable rod may have a length sufficient to extend between a top protrusion 16 of plate 12 and a bottom protrusion 17 of plate 12.

Figure 12:
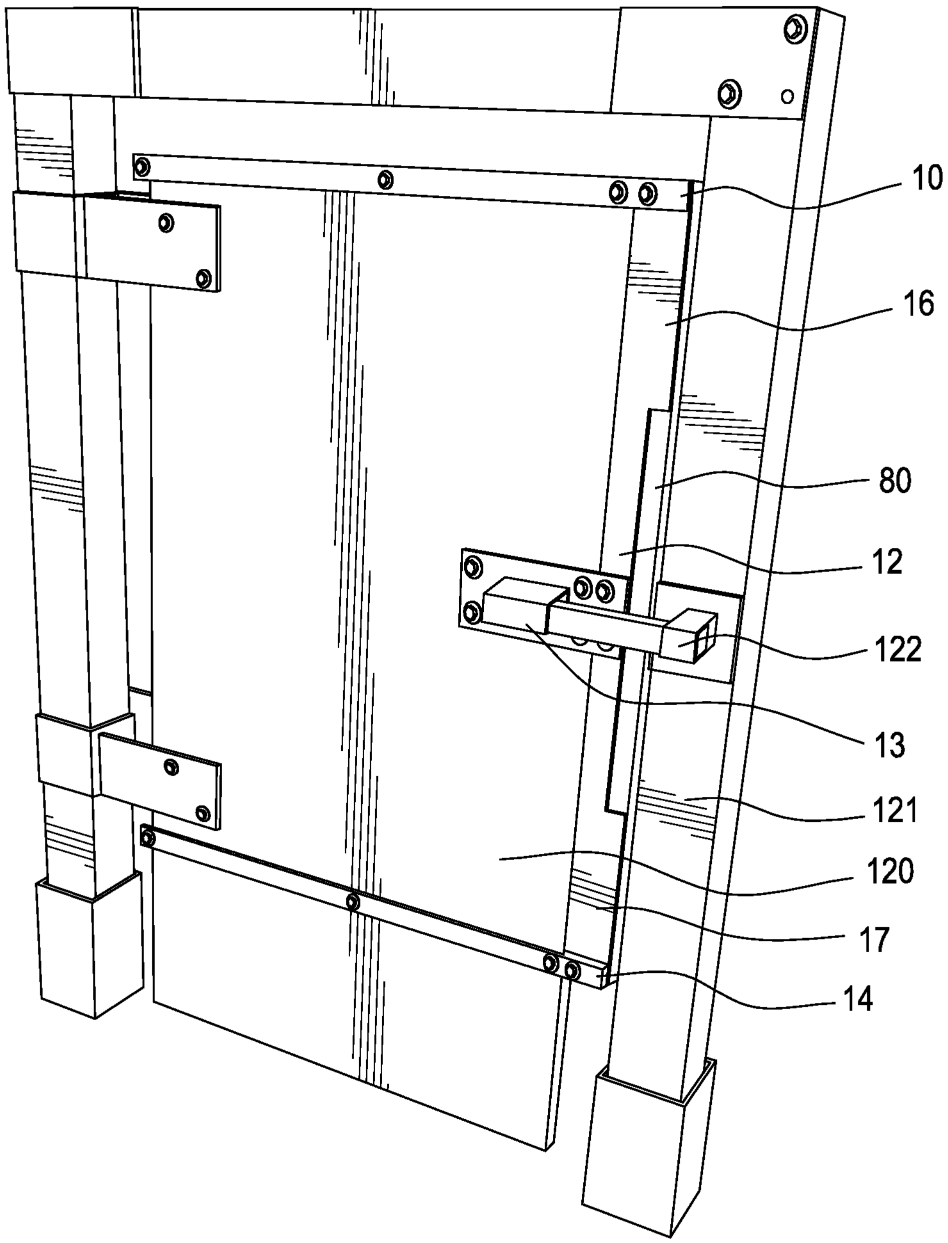
FIG. 12 shows a perspective view of the assembled door frame system installed on a door, according to example embodiments.

FIG. 12 shows a perspective view of the assembled door frame system installed on a door 120, and connected to a doorway frame. As shown in FIG. 12, door 120 is prevented from swinging open by a lock, such as the locking mechanism comprising box 13 and the piece of wood within box 13 that also is received into a receptacle hollow tube 122 (which may have a square shape or other shape) on the door jamb 121. As shown, a standalone doorway frame, having bottom floor plate connected to vertical frame pieces as well as a top frame piece can be used to form the door jamb 121. The door frame may be sized to fit into the doorway frame to simulate an actual door in a doorway of a building. However, in other embodiments, an assembled door frame system can be used in an existing doorway, or in a custom-built doorway.

Figure 13:
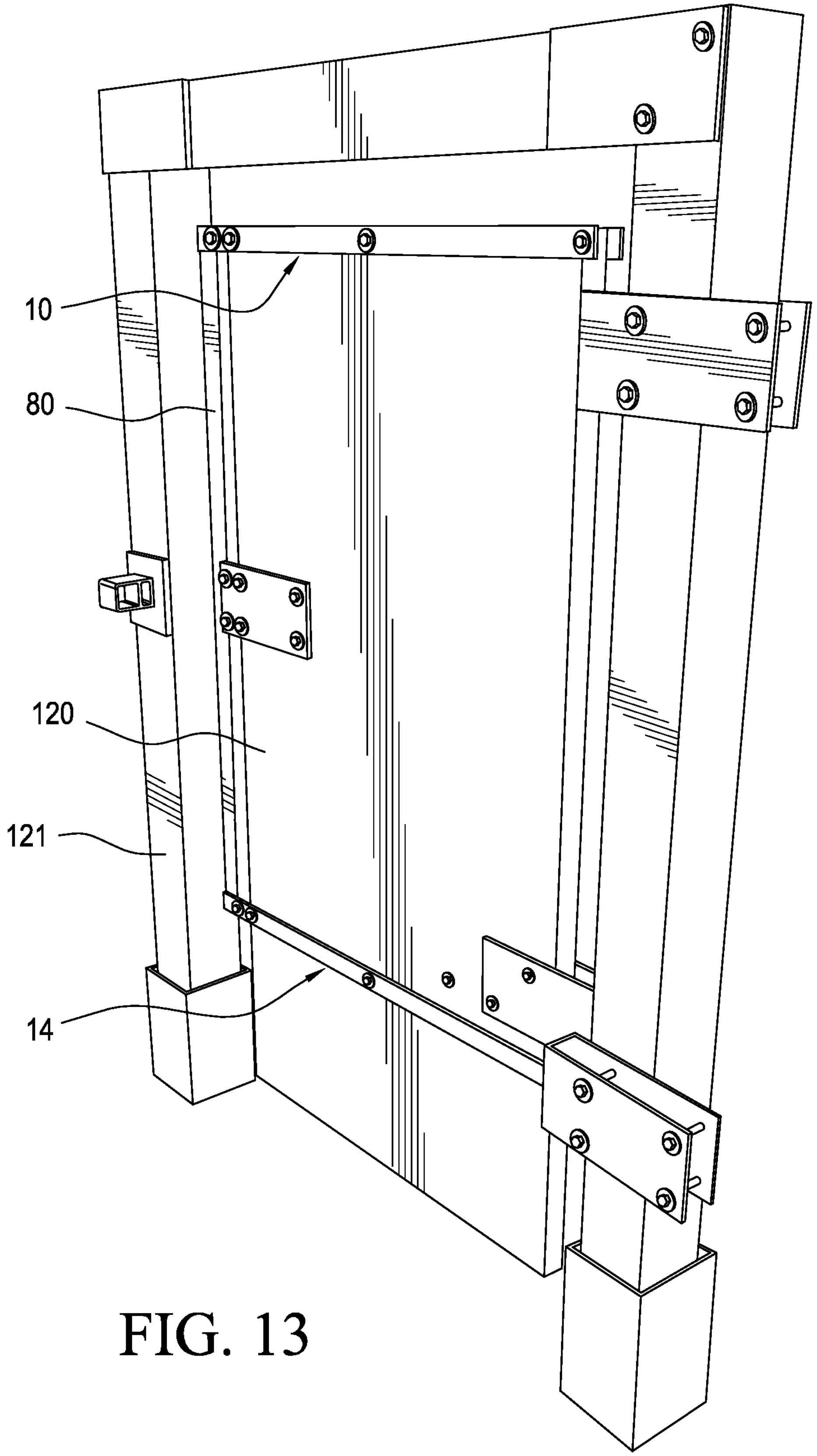
FIG. 13 shows the backside of the door and assembled door frame system shown in FIG. 12, according to example embodiments.

Along the right hand side of the doorway is shown plate 12 with jutting out portions 16 and 17, and compressible material (i.e. wood) 80. Also shown are top rail 10 and bottom rail 14 bolted through the door 120 by the brackets of the top and bottom rails being disposed on opposite sides of the door 120, as shown in FIG. 13.

In preparation for conducting a training session, the door frame is bolted onto a door with the top and bottom brackets disposed so that an upper and lower bracket are on each side of the door. For example, the door can be a shorter version of a regular-sized door, or can be an actual-sized door, though in some embodiments, the door will be reduced in size so that the door with the door frame attached have a size that fits into the doorway. Thus, a training door may include a door portion formed of a door material, the door portion including a top edge extending in a first, horizontal direction, a bottom edge extending in the first, horizontal direction, and an unhinged side edge extending between an end of the top edge and an end of the bottom edge in a second, vertical direction (see, e.g., FIGS. 12 and 13). The training door may also include a frame portion formed on the door portion. The frame portion can include a top rail (e.g., 10) on a top portion of the door portion (e.g., along a top edge or on a top half or third of the door portion), the top rail extending in the first direction, a bottom rail (e.g., 14) on a bottom portion of the door portion (e.g., along a bottom edge, or on a bottom half or third of the door portion), the bottom rail extending in the first direction, and a rigid connector including an open channel (see, e.g., FIGS. 1 and 3-5), the rigid connector extending in the second direction along the unhinged side edge of the door portion between the top rail and the bottom rail. The rigid connector may include, for example, a rod (e.g., 22) having a first side surface (e.g., 22*b*) flush against the unhinged side edge of the door portion, and an open channel having open side opposite the first side surface and facing away from the door portion (see, e.g., FIGS. 5, 8, 9, and 12). The open channel may have a size and shape configured to receive a rod or bar formed of a door material (e.g., see FIGS. 8-11), and may be formed at least in part from the top rail 10, the bottom rail 14, the plate 12 extending between the top rail and the bottom rail, and a portion of the member 22 (e.g., surface 22*a*). The door material of the rod or bar may be the same or a different material from the door material that forms the door portion.

A compressible door material, for example, in the shape of a rod or bar, is then placed in stile spine 23. As noted above, the crushable material can comprise any door material including, but not limited to, wood or metal. The locking mechanism is then set by placing a piece of material (e.g., wood) across the existing doorjamb and into box 13. During the training session, the trainee uses a Halligan bar in conjunction with a fire axe, or other tools that serve the same function, to pry apart the framed door from the doorjamb by compressing the compressible door material and forcing the framed door open, thereby opening the training door. For example, a portion of the Halligan bar can be jammed between the doorjamb and the compressible door material, and then the framed door can be forced open, breaking the locking mechanism (e.g., breaking a piece of material, such as wood, placed and then wedged into the locking box 13). Thus, trainees using the herein described exemplary embodiments gain experience that accurately simulates the actual compression of door materials and the actual breaking of a door lock in opening a locked door. The tools can be used to open the training door either from the inside or the outside (e.g., inward or outward opening doors).

Many training sessions can be conducted before the compressible material needs to be replaced in the above described door frame system. Simply by moving the current Halligan bar entry point a few inches above or below previously used entry points prevents the crushable material from having to be replaced after previous training sessions (see, FIG. 11). Rotating or reversing the material to present uncrushed surfaces also serves to provide additional training sessions before having to replace the crushable material. Testing of the system has shown that a single piece of wood can be used for at least 60 test runs of opening a training door. Thus, rather than replacing an entire door every 60 or so test runs, only a small piece of wood or other compressible material may need to be replaced.

While various aspects of the inventive concept have been particularly shown and described with reference to exemplary embodiments thereof, it will be understood that various changes in form and details may be made therein without departing from the spirit and scope of the herein described subject matter. For example, certain aspects of the above described exemplary embodiments may be utilized with standalone systems. More particularly, the replaceable and crushable door material fitted into an open channel or stile spine, at the unhinged side of the door to be opened, can be used in a standalone system.

What is claimed:

1. A training system for training to pry apart a locked training door from its doorjamb, the system comprising:

a door frame including:

a top rail comprising a top inward bracket and a top outward bracket, and a bottom rail comprising a bottom inward bracket and a bottom outward bracket;

a plate extending between the top and bottom rails;

a member adjacent to and connected to the plate along its length and at right angles to the top and bottom outward brackets to form a U-shaped assembly, the member including an outer surface facing toward the outside of the door frame and extending between the top and bottom rails; and a plurality of bolt and nut assemblies disposed along the top and bottom rails for securing the top brackets to each other and the bottom brackets to each other, wherein the top and bottom inward and outward brackets, the plate, and the outer surface of the member define an open stile spine at the unhinged side of the training door; and a compressibly-connectable rod formed of door material, having a shape and size that firmly fits in the open stile spine.

2. The system of claim 1, wherein the compressibly-connectable rod has a length sufficient to extend between the top rail and the bottom rail.

3. The system of claim 1, wherein the plate includes a straight portion extending lengthwise between the top rail and the bottom rail, and includes a plurality of protrusions extending along a lengthwise direction in which the top rail and bottom rail extend, the protrusions including a top protrusion that overlaps the top rail and a bottom protrusion that overlaps the bottom rail.

4. The system of claim 3, wherein the compressibly-connectable rod has a length sufficient to extend between the top protrusion and the bottom protrusion.

5. The system of claim 1, wherein the top and bottom rail each extend lengthwise in a first, horizontal, direction, and the plate and the member each extends lengthwise in a second, vertical, direction, and the plate extends in the first, horizontal direction beyond the outer surface of the member.

6. The system of claim 5, wherein the plate includes a first portion that extends a first distance in the first, horizontal direction beyond the outer surface of the member, and second portions that extend a second distance beyond the outer surface of the member in the first, horizontal direction greater than the first distance, thereby protruding beyond the first portion.

7. The system of claim 6, wherein the first distance is between about ¼ inch and ½ inch.

8. The system of claim 7, wherein the second distance is about 1½ inches.

9. The system of claim 1, wherein the door material is wood.

10. The system of claim 9, wherein the wood comprises a square-shaped strip having a cross-sectional width and length greater than the cross-sectional width and length of the open stile spine by about 2% to 5%.

11. The system of claim 1, wherein the door material is a metal.

12. The system of claim 1, further comprising a lock that prevents the training door from swinging open.

13. A training door frame for use in training for prying apart a locked training door from its doorjamb, the door frame comprising:

a top rail extending in a first, horizontal direction along a top portion of a door;

a bottom rail extending in the first direction along a bottom portion of the door; and a rigid connector including an open channel, the rigid connector extending in a second, vertical direction along an unhinged edge of the door between the top rail and the bottom rail, wherein the open channel has an open side facing toward an outside of the door frame, and has a size and shape configured to receive a rod or bar formed of a door material.

14. The training door frame of claim 13, wherein:

the open channel has a size and shape configured to compressibly affix the rod or bar within the open channel.

15. The training door frame of claim 13, further comprising:

a lock connected to the rigid connector.

16. The training door frame of claim 13, wherein the rigid connector further includes:

a plate disposed along an outward-opening surface of the door along the unhinged edge of the door, wherein the plate includes a straight portion extending in the second direction between the top rail and the bottom rail, and includes a plurality of protrusions arranged vertically along the length of the straight portion and connected to the straight portion, each protrusion extending beyond the straight portion in the first direction.

17. The training door frame of claim 16, wherein:

the protrusions include a top protrusion that overlaps the top rail and a bottom protrusion that overlaps the bottom rail.

18. The training door frame of claim 16, wherein the rigid connector further includes:

a rod connected to the plate and extending in the second direction along the unhinged edge of the door, the rod including a surface facing the same direction as the open side of the open channel, wherein:

the straight portion of the plate where the protrusions are not connected overlaps the rod in a third, horizontal direction perpendicular to the first direction, and extends in the first direction beyond the rod.

19. The training door frame of claim 18, wherein:

the straight portion of the plate where the protrusions are not connected extends in the first direction beyond the rod by a distance of between ¼ inch and ½ inch.

20. A training door for use in training for prying apart a locked training door from its doorjamb, said training door comprising:

a door portion formed of a door material, the door portion including a top edge extending in a first, horizontal direction, a bottom edge extending in the first, horizontal direction, and an unhinged side edge extending between an end of the top edge and an end of the bottom edge in a second, vertical direction;

a frame portion formed on the door portion, the frame portion including:

a top rail on a top portion of the door portion, the top rail extending in the first direction;

a bottom rail on a bottom portion of the door portion, the bottom rail extending in the first direction; and a rigid connector including an open channel, the rigid connector extending in the second direction along the unhinged side edge of the door portion between the top rail and the bottom rail, wherein the rigid connector includes a rod having a first side surface flush against the unhinged side edge of the door portion, and an open channel having open side opposite the first side surface and facing away from the door portion, the open channel having a size and shape configured to receive a bar formed of a door material that may be the same or a different material from the door material that forms the door portion.

21. The training door of claim 20, wherein:

the open channel is formed at least in part from the top rail, the bottom rail, a plate extending between the top rail and the bottom rail, and a portion of the rod.

* * * * *